Feb. 7, 1956    A. E. DENTLER    2,733,916
RUBBER SHOCK ABSORBING MEANS
Filed May 4, 1953
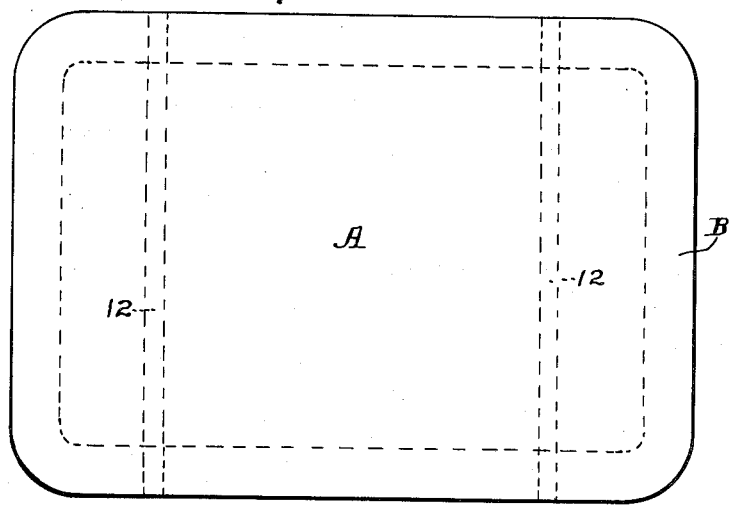
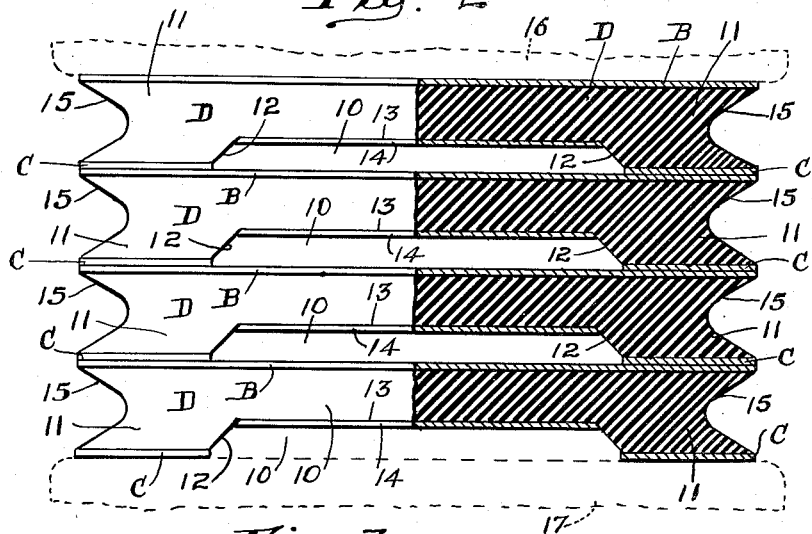
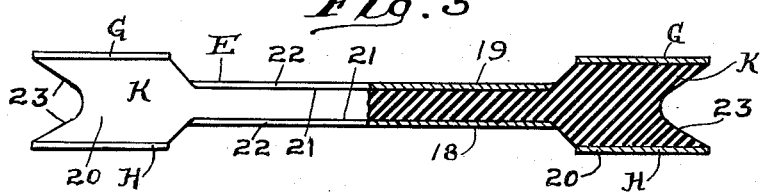
Inventor:
Arnold E. Dentler.
By Henry Fuchs
Atty.

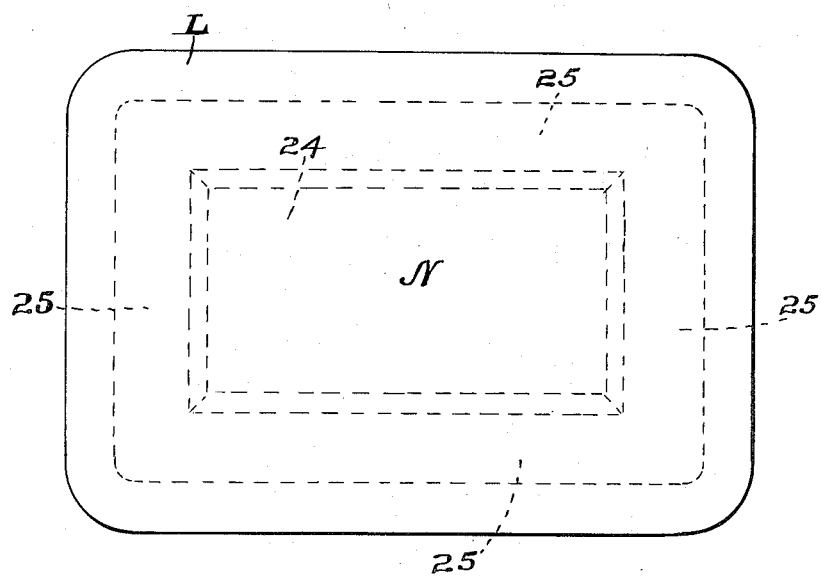
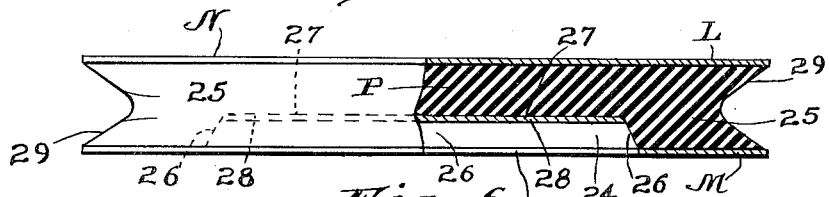
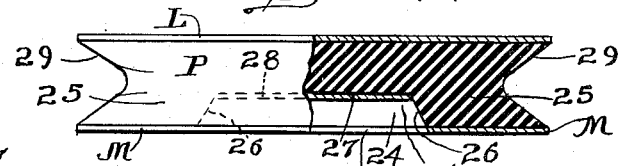
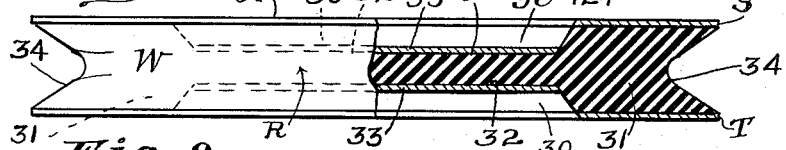
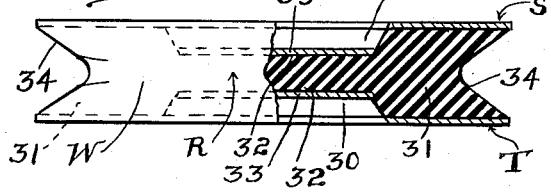

United States Patent Office 2,733,916
Patented Feb. 7, 1956

2,733,916

RUBBER SHOCK ABSORBING MEANS

Arnold E. Dentler, Western Springs, Ill., assignor to W. H. Miner, Inc., Chicago, Ill., a corporation of Delaware Application May 4, 1953, Serial No. 352,693

7 Claims. (Cl. 267—63)

This invention relates to improvements in rubber shock absorbing means.

One object of the invention is to provide a rubber shock absorbing means having soft initial action to absorb relatively light shocks, with final high capacity to absorb heavier shocks, composed of a pack or stack of cushioning units, each unit of which is composed of a pair of metal plates and a rubber mat or pad interposed between said plates, wherein the pad or mat is centrally recessed thereby providing thickened portions of said pad, outwardly of said recessed portion, which serve to produce the soft initial action due to being subjected to compression before full volume compression of said pads.

A further object of the invention is to provide a rubber cushioning means of the character indicated composed of a plurality of units, each unit comprising a rubber pad and metal covering plates between which said pad is disposed, wherein the units are arranged in series to form a pack or stack, and the rubber pad of each unit has a central depression in one side thereof, and the opposite side presents a continuous flat surface, and the flat surface is covered by a single flat plate, while the bottom of the central depression and the surrounding portion of the other side of the pad are covered by separate plates.

A still further object of the invention is to provide a rubber cushioning unit composed of a rubber pad or mat and a pair of metal covering plates between which said pad is disposed, wherein the pad has recesses or central depressions at the opposite sides thereof, the bottom walls of the recesses or depressions being covered by separate metal plates.

Other objects of the invention will more clearly appear from the description and claims hereinafter following.

In the accompanying drawings forming a part of this specification, Figure 1 is a top plan view of my improved rubber shock absorbing means.

Figure 2 is a part side elevational and part longitudinal, vertical sectional view of Figure 1.

Figure 3 is a view similar to Figure 2 of a modified form of cushioning unit employed in a mechanism of the type illustrated in Figures 1 and 2.

Figure 4 is a plan view of a cushioning unit illustrating still another modified form of the invention.

Figure 5 is a part side elevational and part longitudinal, vertical sectional view of Figure 4.

Figure 6 is a part end elevational and part transverse, vertical sectional view of Figure 4.

Figure 7 is a view similar to Figure 5, showing yet another modified form of cushioning unit.

Figure 8 is a part side elevational and part transverse, vertical sectional view of Figure 7, looking from left to right in said figure.

Referring first to the embodiment of the invention illustrated in Figures 1 and 2, my improved shock absorbing means comprises broadly a plurality of units A—A—A—A arranged in series to form a pack or stack, each unit being composed of a top plate B, a set of bottom plates C—C, and a rubber mat or pad D interposed between the plate B and the plates C—C.

The top plate B of each unit A is in the form of a relatively thin flat metal member of substantially rectangular outline with rounded corners, and each bottom plate C is in the form of a flat metal strip corresponding in length to the width of the plate B. The plates C—C of each unit A are arranged transversely of the same at opposite ends thereof and have their outer side edges and their opposite end edges flush with the corresponding edges of the plate B, the outer corners of the plates C—C being rounded off to match the rounded corners of the plate B.

The rubber pad D of each unit is also of generally rectangular outline, and corresponds in overall size to the plate B. Each pad D is provided with a central transverse depression or recess 10 at its lower side, thus leaving thickened portions 11—11 at opposite ends of said pad. The recess 10 is defined by spaced parallel sloping end walls 12—12 extending transversely of the pad. The top side of the pad D is bonded or vulcanized to the bottom side of the plate B and the bottom side thereof is bonded or vulcanized to the plates C—C, the entire area of the plate B being secured to the top side of the pad and the plates C—C being secured to the bottom side of said pad, at the thickened end portions 11—11, which are at opposite sides of the recess 10. The depressed back wall of the recess 10, which wall is indicated by 13, is protected by a rectangular metal liner plate 14, which is secured in place by being bonded or vulcanized to the pad.

The peripheral edges of the pad D are indented, or grooved, as indicated at 15. The indentations or grooves are of such a depth and transverse cross section that the material of the pad throughout said edges will be flush with the edges of the plates when the unit is compressed to a predetermined limit.

In the complete pack or stack of units, as shown in Figure 2, the voids provided by the transverse depressions or recesses 10 of the pads D limit contact between the plates C—C and the pads D to the thickened areas at opposite ends only of the latter, when the shock absorbing means is in expanded condition, so that only these thickened portions of the pads are compressed when compression of the stack of cushioning units is begun.

As illustrated in Figure 2, my improved rubber shock absorbing means is employed between two relatively movable followers 16 and 17, indicated in dotted lines. Upon relative approach of the followers 16 and 17, the rubber shock absorbing mechanism is compressed therebetween, the pads D being first compressed at their thickened end portions 11—11, thus providing soft initial action. As the compression of the mechanism is continued, the portions 11—11 of the pads D—D are gradually flattened until the plates 14—14 on the back walls of the recesses 10—10 of the respective units engage the adjacent top plates B—B of the pack, and the plate 14 of the bottom unit is engaged by the bottom follower 17, after which the entire volume of each pad is actively compressed to provide high shock absorbing capacity.

Referring next to the embodiment of the invention illustrated in Figure 3, the design of the unit shown, which is indicated by E, is similar to that illustrated in Figures 1 and 2, with the exception that the pad of the unit is provided with transverse recesses on both the top and bottom sides thereof.

The unit E includes top and bottom, striplike sets of metal plates G—G and H—H, similar to the plates C—C hereinbefore described, and a rubber mat or pad K interposed between the sets of top and bottom plates G—G and H—H. The pad or mat K is provided with transverse recesses or depressions 18 and 19 in both the bottom and top sides thereof, thus leaving thickened portions 20—20 at opposite ends of said pad. The back walls of the recesses 18 and 19, which walls are indicated by 21—21, are protected by metal liner plates 22—22 secured in place by being bonded or vulcanized to the rubber pad K. The sets of plates G—G and H—H are also secured to the pad, the top and bottom sides of the thickened portions 20—20 of the latter being bonded or vulcanized, respectively, to said plates G—G and H—H.

The four edges of the pad K are indented or grooved in a manner similar to, and for the same purpose as, the pad A hereinbefore described, the indentations of the pad K being indicated by 23—23—23—23.

Referring to the embodiment of the invention illustrated in Figures 4, 5, and 6, the design of unit shown, which unit is indicated by N, is similar to that illustrated in Figures 1 and 2, with the exception that the recess at the bottom side of the unit N is spaced inwardly from both the sides and ends of the unit, instead of extending transversely from one side to the other of the same, as is the case in the unit A.

The unit N comprises rectangular top and bottom metal plates L and M and a rectangular rubber pad P, interposed between and bonded or vulcanized to the plates L and M.

The pad P is provided with a central recess or pocket 24 at its lower side, thus leaving thickened portions 25—25—25—25 entirely surrounding said recess or pocket. The recess or pocket is defined by spaced parallel sloping end and side walls 26—26—26—26. The bottom plate M is provided with a central opening or recess 124 which extends therethrough and corresponds in size to and registers with the pocket 24 of the pad P. The depressed back wall of the recess 24, which wall is indicated by 27, is protected by a rectangular liner plate 28, which is secured in place by being bonded or vulcanized to the pad. The pad P, like the pad D and for the same purpose, has its four edges grooved, as indicated at 29—29—29—29.

Referring to the embodiment of the invention illustrated in Figures 7 and 8, the design of unit, which unit is indicated by R, is similar to that illustrated in Figures 4, 5, and 6, with the exception that the pad of the unit R is provided with central recesses or pockets at both the top and bottom thereof.

The unit R includes top and bottom, centrally recessed, rectangular plates S and T and a rubber mat or pad W interposed between the plates and vulcanized thereto. The pad W is provided with recesses or pockets 30—30 in both the top and bottom sides thereof, which register with the recesses of the plates S and T and are similar to the pocket 24 shown in Figures 4, 5, and 6. The arrangement of pockets shown in Figures 7 and 8 leaves thickened border portions 31—31—31—31 surrounding the same. The back walls of the pockets 30—30, which back walls are indicated by 32—32, are protected by metal liner plates 33—33 secured in place by being bonded or vulcanized to the rubber pad W. The four edge walls of the pad W are grooved, as indicated by 34—34—34—34. These grooves are identical with, and serve the same purpose as, the grooves 15—15—15—15 of the pad D of the unit A hereinbefore described.

I claim:

1. A shock absorbing mechanism comprising a plurality of units arranged in series, each unit comprising a pair of flat metal plates and a flat rubber pad interposed between said plates, said pad being recessed at one side, said recess having a flat back wall, and a flat liner plate overlying said back wall.

2. A shock absorbing mechanism comprising a plurality of units arranged in series, each unit comprising a pair of flat metal plates and a flat rubber pad interposed between said plates, said pad being recessed at opposite sides, each of said recesses having a flat back wall, and flat liner plates overlying said back walls of said recesses.

3. A shock absorbing mechanism comprising a stack of units, each unit comprising spaced flat metal plates and a rubber pad interposed between said plates, said pad being thickened at opposite ends and having the thickened portions thereof abutting said plates, said portion of said pad between said thickened portions being substantially flat and straight, said flat and straight portion being covered by a flat metal plate.

4. A shock absorbing mechanism comprising a stack of units, each unit comprising a pair of flat metal plates and a rubber pad interposed between said plates, one side face of said pad of each unit having a portion thereof recessed, said recessed portion presenting a flat back wall covered by a flat metal plate, the opposite side of said pad being substantially flat, said recessed side abutting one of said plates, and the flat side abutting the other plate of said unit.

5. A shock absorbing mechanism comprising a stack of units, each unit comprising a pair of flat metal plates and a rubber pad interposed between said plates, each of said plates having a central opening extending therethrough and the opposite sides of said pad being centrally recessed in alignment with said openings and having the portions thereof outwardly of said recessed portions bearing on said plates, each of said recessed portions having a flat back wall, said back wall of each recessed portion being covered by a flat metal plate.

6. A shock absorbing mechanism comprising a plurality of units arranged in series, each unit comprising a pair of flat metal plates and a flat rubber pad interposed between said plates, said pad being recessed at one side, the flat metal plate at the recessed side of said pad having an opening therethrough in alignment with said recess, said recess of said pad having a flat back wall, and a flat metal liner plate overlying said back wall.

7. A shock absorbing mechanism comprising a plurality of units arranged in series, each unit comprising a pair of flat metal plates and a flat rubber pad interposed between said plates, said pad being recessed at opposite sides, each of said metal plates having an opening therethrough in alignment with the recess at the corresponding side of the rubber pad of said unit, each of said recesses having a flat back wall, and flat metal liner plates overlying said back walls of said recesses.

References Cited in the file of this patent

UNITED STATES PATENTS

| | | |
|---|---|---|
| 2,165,383 | Johnson et al. | July 11, 1939 |
| 2,187,156 | Johnson | Jan. 16, 1940 |
| 2,322,193 | Kaemmerling | June 15, 1943 |
| 2,553,635 | Dath | May 22, 1951 |

FOREIGN PATENTS

| | | |
|---|---|---|
| 762,631 | France | Jan. 22, 1934 |